Nov. 17, 1959  A. R. BREMER ET AL  2,913,269
HIGH PRESSURE HIGH TEMPERATURE METAL SEALS
Filed June 18, 1956  2 Sheets-Sheet 1

INVENTOR.
ALLEN R. BREMER
JOHN W. HULL
BY Reynolds, Beach
+ Christensen
ATTORNEYS

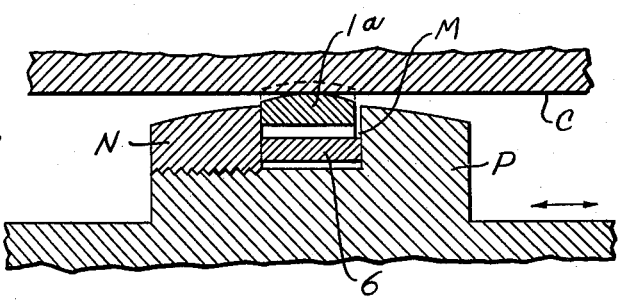
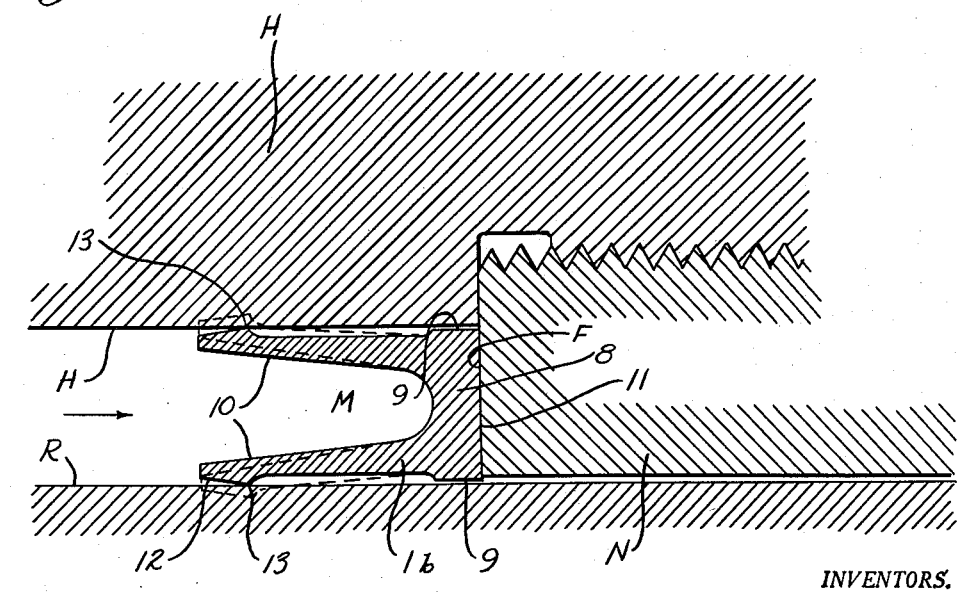

United States Patent Office 2,913,269
Patented Nov. 17, 1959

2,913,269

HIGH PRESSURE HIGH TEMPERATURE METAL SEALS

Allen R. Bremer, Seattle, and John W. Hull, near Kirkland, Wash., assignors to Boeing Airplane Company, Seattle, Wash., a corporation of Delaware Application June 18, 1956, Serial No. 591,835

9 Claims. (Cl. 288—14)

Seals which embody rubber-like materials, resins, or other materials which are adversely and permanently effected by high temperatures or pressures are unsuited to contain high temperature fluids at high pressures. Metal seals have been used, but particularly in installations where relative movement occurs, externally as a piston within its cylinder, or internally as a piston rod within its gland, the useful life of a metal seal has been rather short, in the forms heretofore used. All such metal seals depend on the elasticity of the metal. A small amount of wear, even under normally expected frictional loads, has worn such metal seals away beyond their limit of elastic recovery, after which the seal has leaked. Additionally, misalignment in small amounts has limited the usefulness of such seals. Moreover, the range of temperatures throughout which they held tight was limited, and such a seal had to be designed to be tight within a fairly narrow range of working temperature, and has not been expected to be tight throughout all ranges. This was so in part because of thermal changes in the relative sizes of or clearances between the metal seals and the parts sealed, and the seeming necessity of designing the seal to operate, at working temperatures, within its elastic range.

The seal of the present invention is a metal seal, and differs from seals heretofore employed primarily in that it is installed, and is designed to operate, at all temperatures, in a condition of strain beyond the elastic limit of the metal employed, hence within the plastic range of the metal. Within the plastic range there is still elastic recovery from strain, not to the initial, unstrained dimension, but to a different dimension, yet throughout a wider range of recovery. By virtue of this wider range of elastic recovery the seal will hold a wide range of pressures throughout a greater range of temperatures, and will hold throughout a longer period of time and greater wear, even under some misalignment, and without producing excessive frictional loads.

It will be convenient to consider the seal of this invention embodied in the form of a ring, although in the broad sense the invention is independent of the form of the seal, and might be embodied in rectilinear seals.

The seal of this invention primarily is capable of maintaining sealing against a wide range of pressures, for example, from 0 p.s.i. to 20,000 p.s.i., or more, throughout a range of temperature from, say, −150° F. to, say, +1500° F. It is of inherently simple construction, of long effective life, its installation, while not strictly simple, is not unduly difficult, and it can be of metal which is insensitive to, and which has no harmful effect upon, all media likely to be contained and worked upon, except the most corrosive agents. By proper selection of a metal the seal can be made insensitive also to nuclear radiations.

The seal of this invention has the further advantage that it can be made to be substantially self-lubricating in the presence of a lubricant film, and insensitive to minor misalignments, or self-aligning under such conditions. It has long or virtually indefinite shelf life, not deteriorating with long storage prior to installation and use. In annular or ring form it is adapted to sealing as between relatively rotative or relatively reciprocable machine elements, and available for use as an external or as an internal seal.

Speaking generally, the seal of this invention is formed as a metal strip—usually of annular or ring-like form, for interposition between a piston and a cylinder, or between a piston rod and its guiding bore in a cylinder head, for example—which ring is of a size, or has an arm or arms projecting from a base and of a size, in excess of the space available between the relatively movable machine elements, that the ring as a whole, or the arm or arms thereof, are stressed by installation and during use beyond the elastic limit of the component metal. The metal, so stressed in its plastic range, will recover elastically from deformation, not to its initial dimension, but over a greater range, and so will remain effective as a seal so long as it retains any residual elasticity. The residual elasticity of the metal, in the plastic range, affords an adequate sealing force to maintain the seal at low pressures, while in certain forms of the ring the pressure being contained itself provides the primary sealing force, and this force acts the more effectively the higher is this pressure.

Moreover, by suitable design of the sealing ring with relation to the two relatively movable machine elements (one of which is normally recessed to receive the sealing ring) and to the working clearance between them, the seal is maintained in virtual self-alignment, in its operating position, with relation to such elements.

Also, by proper design of the sealing ring in the vicinity of its point of bearing upon one such machine element—the ring bearing against a surface of the other such element, for movement with and for sealing with respect to the latter—the sealing ring during movement, and especially reciprocative movement, with relation to the element whereon it bears, will afford purposely a somewhat imperfect seal, under pressure and in such manner that a wedge-shaped collection of lubricant will occur in advance of the point of bearing, and a thin film from that collection will pass beneath the ring at its point of bearing and adhere to the surface borne upon, to provide effective lubrication while still maintaining the integrity of the seal against the contained pressure medium.

The net results, from the advantages touched upon, and flowing from the structural changes employed, include (a) lessened manufacturing cost due to increased tolerances, (b) longer effective life of the seal, and consequent avoidance of the necessity for frequent replacement thereof, and (c) adequate effectiveness of the seal at all temperatures despite the higher tolerance, and longer usage without replacement.

The invention, and the principles upon which it is based, will be better understood by reference to certain specific illustrations or embodiments thereof, shown in the accompanying drawings, described hereafter in this specification, and defined in the acocmpanying claims.

Figure 3 is a view similar to Figure 2, of a modified installation.

Figure 4 is an axial sectional view of a piston and cylinder, conventionally shown, to illustrate the applicability of the seal of this invention to interior and to exterior seals alike.

Figure 5 is an enlarged cross-sectional view of a rather radically modified form of seal, still incorporating the principles of this invention.

Figure 1:
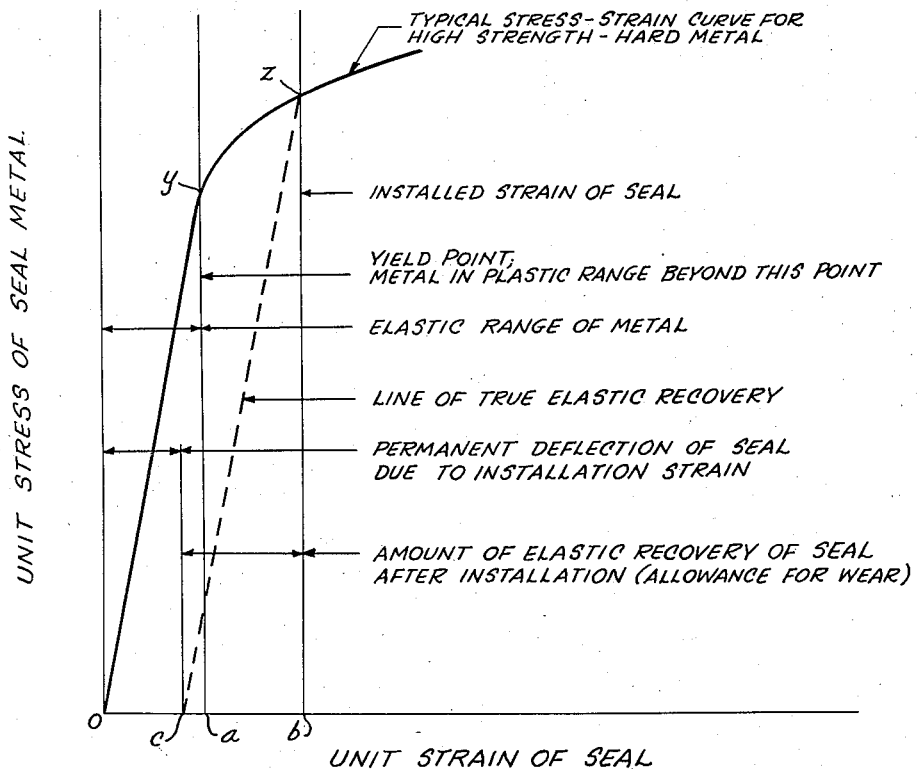
Figure 1 is a graphic illustration of the relationship between stress and deformation as they exist in a seal operating according to the principles of this invention.
Figure 2:
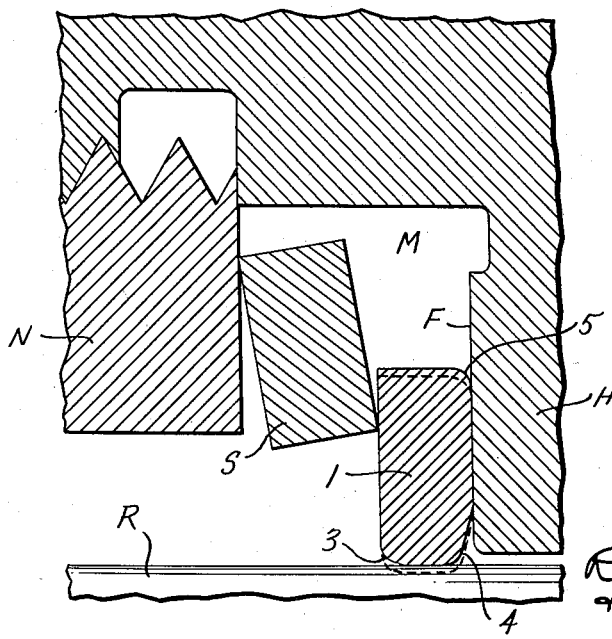
Figure 2 is an enlarged cross-sectional view of a typical form of seal, according to this invention, as installed to contain pressure during relative reciprocating movement of the two machine elements.

A typical embodiment of this invention is illustrated in Figure 2 of the drawings, and will be explained by way of example, to illustrate the principles involved, with reference to the graph, Figure 1. In Figure 2 the seal is embodied in a one-piece ring 1 of metal, interposed between a piston rod R reciprocative within a bore through a cylinder head H. Clearances, for the most part, are shown exaggeratedly, as is the extent of deformation. The ring is installed, in the example, within a recess M in the head H, and is urged against the latter's face F by a Belleville spring S, reacting from a nut N, so that it cannot move appreciably relative thereto under the influence of reciprocative movement of the rod R.

Purposely the internal diameter of the ring 1 is such with relation to the diameter of the rod R that appreciable deformation of the ring is required to effect its installation. The ring must expand from the dash-line position to the full-line position. This deformation is calculated to be of an amount in excess of the elastic limit of the metal of which the ring is formed. If, for example, the material of which the ring is made is SAE 4340 alloy, for high temperature high tensile strength installations, and its elastic limit is 0.2% deformation at 75000 p.s.i., but it is installed with a deformation of 0.4% at 140,000 p.s.i., the ring will retain a certain permanent deformation upon relief of the deforming stress, yet will have a certain residual elasticity which will cause its return towards initial size over a wider range than if it had not been strained beyond its elastic limit, upon relief of the stress in even minor degree, as by normal wear.

To illustrate, refer to Figure 1. A given metal of which a sealing ring is made may be assumed to be elastically deformable under stress as represented at $Oy$, and if the stress does not exceed the value $ay$ the ring will resume its initial dimension $O$ upon removal of the deforming stress. The metal's elastic limit is represented at $y$, and if the stress exceeds the value $ay$, and is instead as represented at $bz$, permanent deformation occurs. Upon relief of the deforming stress, the metal still having residual elasticity, it will return to the dimention represented at $c$, along a line $zc$ parallel to the line $yO$. The measure of the permanent deformation is represented at $cO$. However, the measure of total possible residual elastic deformation, once the elastic limit $y$ is passed, is represented at $bc$. This compares with the total possible elastic deformation within the yield point (along the line $Oy$), which is represented at $aO$, and is seen to be appreciably in excess of the latter. If the unit strain $ab$ is equal to the unit strain $Oa$, the total elastic recovery $bc$ is greater than the total elastic recovery $aO$ by $ac$. There is thus seen to be an appreciably greater margin for wear, or for changes due to thermal effects, etc., and a sealing ring thus deformed at installation beyond its elastic limit will remain tight longer, over wider ranges of pressure and temperature, and will adjust more readily for wear and for minor misalignment.

It will be understood that the seal ring 1 is made of an internal diameter (when used, as in Figure 2, as an internal seal) less than the diameter of the rod R; the ring's unstressed initial diameter is represented exaggeratedly by the dash lines; the actual differential in size would in most cases be measured in tens of thousandths of an inch. At installation the ring 1 is forced upon the rod R, expanding and straining the ring beyond its elastic limit, and into its plastic range, as indicated in full lines.

Such installation causes the ring to bear tightly about the rod R, but the ring's bore is shawed to bear tightly about the rod R, but the ring's bore is shaped to assist in lubricating the contacting surfaces of ring and rod. The ring is relieved, or radiused, at 3, so that when the rod R moves to the right relative to the ring, the lubricant upon the rod will gather in the wedge-shaped recess defined by the radius 3, and will be somewhat pressurized. Most such lubricant will merely collect in that recess, but a small film will be forced, by the pressure and movement, between the contacting surfaces, to lubricate them, while still maintaining the integrity of the seal. Somewhat the same effect occurs, from similar causes, upon reverse reciprocation, the ring being relieved at 4.

A static seal exists between the face F and the contacting face of the sealing ring. The ring is relieved or radiused at this face, as indicated at 5, and lubricant collects in this recess, under pressure, with substantially the same effect.

Should the rod R be slightly misaligned with its gland, the sealing ring 1 will readily adjust itself to such misalignment. It can, to the extent necessary, rock about the upper margin of the relieved portion 4, and shift in the radial sense relative to the face F.

Whereas the seal of Figure 2 is an internal seal, that of Figure 3 incorporates the same principles in an external seal, between a piston P and the cylinder wall C. Here the recess M is in the piston, and the seal ring 1$a$ is of an unstressed external diameter somewhat larger than the internal diameter of the cylinder bore. Upon installation the ring is crowded inwardly and strained beyond its elastic limit, as is intended to be indicated by the dash lines and full line showings, respectively. The auxiliary ring 6 assists in maintaining a static seal.

Figure 4 shows diagrammatically the use of metal seals 1$c$ in both internal and external forms, and of a design somewhat more elaborate than the simple rings of Figures 2 and 3, as shown in greater detail in Figure 5.

The ring of Figure 5, designated in general by the numeral 1$b$, is of $\pi$ shape, having a rigid base 8 with opposite shoulders 9 and two spaced legs 10 which are to be strained. These legs are purposely spread to the extent exaggeratedly indicated in dash lines, in excess of the space available for them in the recess M. They must be stressed, to install them, beyond their elastic limit, to the full line position. By their design the legs are so strained intermediate their ends, so that they retain in part their property of full elastic recovery, and in part their property of residual elastic recovery in the plastic range. Pressure applied between the legs assists their own elasticity in maintaining proper bearing. The shoulders 9, by contact with the walls of the recess or the surface of the rod R, maintain the ring 1$b$ as a whole in correct orientation, and with its surface at 11 against the face F of the nut N, as a static seal. It will be noticed that the free ends of the legs 10 are beveled, at 12, to define the lubricant-collecting recess as before, and to leave a bearing edge at 13, upon the surfaces of the rod R and head H, respectively, as sliding seals.

The seals illustrated are sliding seals, but like principles may be incorporated in rotative seals.

We claim as our invention:

1. In combination with first and second machine elements of generally cylindrical shape coaxially disposed and relatively movable, but spaced apart by a given clearance space, a sealing ring of a metal having a plastic range of deformation and bridging such clearance space and bearing tightly against and statically with relation to the first of said elements, and bearing slidably against and movable over the surface of the second of said elements, said ring at its bearing upon the second element being of sufficiently different diameter than the surface of said second element that the ring is deformed, by its installation, beyond its elastic limit into its plastic range.

2. A combination as in claim 1, wherein the ring's sliding surface when unstressed is of smaller diameter than the element whereon it slides, and surrounds the latter.

3. A combination as in claim 1, wherein the ring's sliding surface when unstressed is of greater diameter than the element wherein it slides, and is compressed within the latter.

4. The combination of claim 1, wherein the ring and the first element whereon it bears statically, and the second element whereon the ring bears slidably, are relatively movable in the axial direction under the influence of pressure applied to one such element, the ring having a wedge-shaped undercut located in advance of its bearing, in the direction of advance under pressure, to define a recess for collection of lubricant which adheres to the surface of the second element, during pressure-induced axial movement relative to the latter.

5. In combination with two machine elements having cylindrical surfaces one whereof surrounds and is spaced slightly from the other, one being recessed for the reception of a sealing ring, an uninterruptedly circular sealing ring of metal having a range of plastic deformation and received in said recess and seating therein to constitute a static seal, and bearing upon the cylindrical surface of the other, said sealing ring being of a diameter such that when thus installed it is stressed radially beyond its elastic limit into its plastic range.

6. In combination with relatively movable first and second machine elements, a seal installed between said elements, especially for use under conditions which subject the seal to high temperatures, and produce marked thermal changes in the sizes of the machine elements and the seal, said seal comprising a strip of a metal having a plastic range of deformation installed in tight contact, under the thermal conditions obtaining in use, with a first such element, interposed between the adjacent surfaces of the two elements, and of a size relative to the second such element, and the spacing between the latter and the first element, to be stressed, by its installation, beyond the sealing strip's elastic limit and into its plastic range.

7. In combination with movable first and second machine elements, a seal installed between said elements, and capable of retaining high pressures, especially under conditions of use which subject the seal and such elements to high temperatures, and produce marked thermal changes in the sizes thereof, said seal comprising a substantially rigid base of a metal having a plastic range of deformation and being of a cross-sectional shape to form at least one integral arm extending from said base, said base being installed in tight and substantially immovable contact, under the thermal conditions obtaining in use, with a surface of one such element, and the arm being installed in sliding contact with a surface of the other such element, and being of a size and shape relative to the other element to be bent by its engagement with such surface thereof, during installation and use, beyond the arm's elastic limit and into its plastic range.

8. In combination with an inner first machine element and a surrounding second machine element, which elements are relatively movable, a seal installed between said elements, and capable of retaining high pressures, especially under conditions of temperature which produce marked thermal changes in the assembly, said seal comprising a ring wholly of metal which has a plastic range of deformation interposed between the two elements, and in cross-section having a substantially rigid base and two spaced arms projecting from the base in general parallelism to concentric surfaces of the two elements, to engage the respective surfaces adjacent the arm's tips which are distant from the base, the arms being of such size and shape, relative to the distance between the two concentric surfaces which they engage, as to be stressed during use, and intermediate their engaged tips and the base, beyond the elastic limit and into the plastic range.

9. In combination with relatively rotatable first and second machine elements which have spaced, generally opposed surfaces, a seal installed therebetween and capable of retaining high pressures, and especially under conditions of temperature which produce marked thermal changes in the assembly, said seal comprising a one-piece ring wholly of metal which has a plastic range of deformation, for interposition between such opposed surfaces, and in cross section having a substantially rigid base and two spaced arms extending from the opposite ends of the base in general parallelism, for engagement each near its tip with the respective opposed surfaces, said ring when unstressed being of such dimensions, relative to the space available between such opposed surfaces, that the spacing between the tips of the arms exceeds that space, the arms being stressed by installation and use in that space beyond their elastic limit and into their plastic range.

References Cited in the file of this patent

UNITED STATES PATENTS

| | | |
|---|---|---|
| 739,859 | Halsey | Sept. 29, 1903 |
| 1,546,525 | Wasson | July 21, 1925 |
| 1,721,325 | Wilson | July 16, 1929 |
| 2,157,299 | Mercier | May 9, 1939 |
| 2,350,123 | Mercier | May 30, 1944 |
| 2,517,497 | Lauenstein | Aug. 1, 1950 |
| 2,754,993 | Maker | July 17, 1956 |